(12) United States Patent
Sarfati

(10) Patent No.: US 6,478,222 B1
(45) Date of Patent: Nov. 12, 2002

(54) DOWNLOADING OF APPLICATIONS IN A DIGITAL DECODER

(75) Inventor: Jean-Claude Sarfati, Epinay sur Seine (FR)

(73) Assignee: Canal+ Societe Anonyme, Paris (FR)

( * ) Notice: Subject to any disclaimer, the term of this patent is extended or adjusted under 35 U.S.C. 154(b) by 0 days.

(21) Appl. No.: 09/542,785

(22) Filed: Apr. 4, 2000

Related U.S. Application Data (63) Continuation of application No. PCT/IB98/01766, filed on Oct. 28, 1998.

(30) Foreign Application Priority Data

Oct. 28, 1997 (EP) ............................................. 97402561

(51) Int. Cl.⁷ .......................... G06K 19/06; G06K 5/00
(52) U.S. Cl. ...................................... 235/380; 235/492
(58) Field of Search .............................. 235/492, 449, 235/380, 375, 379, 381; 725/5, 25; 705/44, 26

(56) References Cited

U.S. PATENT DOCUMENTS

| | | | | |
|---|---|---|---|---|
| 3,890,461 A | | 6/1975 | Vogelman et al. ............. 178/5.1 |
| 5,378,884 A | * | 1/1995 | Lundstrom et al. ........... 235/441 |
| 5,448,568 A | | 9/1995 | Delpuch et al. ............. 372/94.2 |
| 5,737,610 A | * | 4/1998 | Sandig et al. ............... 395/712 |
| 5,831,852 A | * | 11/1998 | Cahill-O'Brien et al. ... 364/188 |
| 6,185,735 B1 | * | 2/2001 | Le Berre ......................... 725/5 |
| 6,202,927 B1 | * | 3/2001 | Bashan et al. ............... 235/451 |
| 6,279,824 B1 | * | 8/2001 | Park ............................. 235/379 |
| 6,296,634 B1 | * | 10/2001 | McMillen et al. ............. 606/10 |
| 6,298,400 B1 | * | 10/2001 | Candelore ..................... 710/71 |
| 6,317,885 B1 | * | 11/2001 | Fries ........................... 725/109 |
| 6,321,385 B1 | * | 11/2001 | Ozawa et al. ................ 725/140 |

FOREIGN PATENT DOCUMENTS

| | | |
|---|---|---|
| DE | 24 45 520 A1 | 4/1976 |
| DE | 41 29 571 A1 | 3/1993 |
| DE | 43 44 317 A1 | 7/1995 |
| EP | 0530 601 B1 | 3/1993 |
| EP | 0 542 048 A1 | 5/1993 |
| EP | 0 585 833 A1 | 3/1994 |
| EP | 0 809 401 A1 | 11/1997 |
| GB | 2 183 368 A | 6/1987 |
| WO | WO 93/07715 | 4/1993 |

\* cited by examiner

*Primary Examiner*—Thien M. Le
(74) *Attorney, Agent, or Firm*—Rosenthal & Osha L.L.P.

(57) ABSTRACT

A method for downloading an executable application into a decoder for a digital broadcast system, characterized in that the application is stored on a portable memory card introduced into a card reader in the decoder, the decoder reading and downloading the application from the card. Data may be preferably be stored in the smart card in a broadcast data format such as the MPEG format to permit the processing of such data in the same manner as the control unit of the decoder processes data downloading by a broadcast transmission. The invention extends equally to a decoder and a memory card for use in such a method.

10 Claims, 3 Drawing Sheets

DOWNLOADING OF APPLICATIONS IN A DIGITAL DECODER

This is a continuation of International Application PCT/IB98/01766, with an international filing date of Oct. 28, 1998.

The present application relates to a method and apparatus for downloading executable applications into a decoder used in a digital broadcast system, for example, as used in a digital television system.

Broadcast transmission of digital data is well-known in the field of pay TV systems, where scrambled audiovisual information is sent, usually by a satellite or satellite/cable link, to a number of subscribers, each possessing a decoder or receiver/decoder capable of descrambling the transmitted program for subsequent viewing. Terrestrial digital broadcast systems are also known. Recent systems have also used the broadcast link to transmit other data, in addition to or as well as audiovisual data, such as computer programs or interactive applications to the decoder or a to a connected PC.

The same decoder unit may be supplied by the system designer to a number of different service providers or broadcast companies in a number of different countries. In such circumstances, some degree of testing or customisation of the decoder unit by the service provider will usually be necessary. Typically, a testing application is used to check the correct operation of the hardware elements of the decoder, eg to confirm that the tuner within the decoder operates correctly etc.

This operation will typically be carried out by the service provider or distributor before the decoder is passed to the consumer, for example, using a dedicated PC and a parallel or series link to the decoder. An application supplied by the system designer and running on the PC is used to adjust the operating parameters of the decoder.

Depending the complexity of the operation and the skills of the operator employed to carry out this task the time necessary to test the decoder can be considerable and can increase the real cost of the finished item by a significant amount.

Furthermore, when installed in the field, a user may also wish to introduce at his own convenience a number of applications functioning with the decoder. Again, the user will be faced with the problem of configuring and running the decoder with an application loaded in a PC etc.

It is an object of the present invention to reduce the time and complexity of this type of operation and to provide a simple means for introducing applications in the decoder.

According to the present invention, there is provided a method for downloading an executable application into a decoder, characterised in that the application is stored on a portable memory card introduced into a card reader in the decoder, the decoder reading and downloading the application from the card.

Use of a portable memory card enables a predetermined application to be easily and simply introduced into the decoder without the necessity, for example, to connect the decoder to a PC, load a program into the PC etc. The time necessary to carry out, for example, a testing operation will be greatly reduced since an operator can load the application into the decoder by a simple insertion of the card into the decoder.

Whilst portable memory cards are known in the field of decoder technology, their use to date has either been restricted to the simple transfer of static data, for example, financial data from a credit card inserted in the decoder, or to hold decryption keys associated with broadcast transmissions. Up until now, such cards have not been used to download executable applications. This is in part due to the perceived slowness of the data link associated with the use of a card slot, which has acted to discourage system designers from this solution.

PCT WO93/07715 discloses a system in which static data corresponding to channel frequency information is held in the memory of a smart card, the smart card being inserted in the television to tune the television to the correct channels. A similar system is described in DE 4344317 in which a smart card is inserted in a slot in a television remote control to control the tuner of the television. Neither document discloses the downloading of an executable application into a decoder.

As will be understood, the present invention is not limited to the downloading of a testing type application. The card may equally be used to introduce an application used to initially configure the decoder. Alternative uses are also imaginable, for example, in which cards bearing a promotional application such as a video game or the like, are distributed directly to the end user of the decoder. Increasingly, decoder units are incorporating more and more functionalities associated with general multimedia products and using a portable memory card provides a relatively simple means for a non-technical consumer to introduce executable applications into the decoder.

The term "portable memory card" includes any portable cards that may be inserted within a corresponding card slot in the decoder. The card may include a microprocessor chip in addition to a simple memory element. The card may be powered via a connection to a power source located internally within the reader slot of the decoder or may include a battery power source.

In one embodiment, the card may conform to the standards necessary to permit reading in a PCMCIA reader in the decoder. Preferably, however, the card is adapted to be read in a smart card reader in the decoder. This solution possesses a number of advantages in comparison, for example, with a PCMCIA card, notably due to the simplicity of the contacts formed on the card which reduces the cost of production and the ubiquity of smart card readers in decoder units.

The characteristics of smartcards and smartcard readers are well known and are defined, for example, in the international standards ISO 7816_1 (physical characteristics), ISO 7816_2 (contact dimensions and placement) and ISO 7816_3 (electrical signals and transmission protocols).

Unlike, for example, bank cards, the smartcards associated with decoder units need not be fully inserted into the unit and may protrude some distance from the decoder. Consequently, whilst the card width and thickness for the inserted part of the card must correspond to the normalised values, the card may be longer than a standard credit card. This leads to the possibility to introduce more and larger components onto the card.

Advantageously, the executable application stored within the card and downloaded into the decoder is formatted according to a broadcast data format, such as an MPEG data format. In the case of application type data held in the payload of a transport packet, the MPEG standard describes the organisation of data into a series of tables, each table including a table ID etc.

In one embodiment, the application data may be subdivided into a number of modules in the memory of the card, the modules being assembled by the decoder to form the complete application.

The advantages associated with the use of MPEG format data are considerable, since the decoder can handle and process such applications in the same manner as it handles applications downloaded via the broadcast link. In the case, for example, where the decoder includes a virtual machine to process data, the application may be written in interpretative code, this code being interpreted and processed by the same logical units within the machine as used for broadcast MPEG applications.

As will be understood, where the decoder is adapted to download digital broadcast transmissions according to an alternative data format, the same advantages may be obtained by organising the data in the card in this format.

According to a further preferred embodiment, some or part of the application stored within the memory card is encrypted with one or more encryption keys. In particular, some or part of the data stored in the memory card may be encrypted and/or signed with a private key, the decoder having access to the equivalent public key so as to decrypt and/or authenticate the origin of the application. In the event of non-authentication of the code, the decoder may refuse to download the code. Other arrangements, using two secret keys of a symmetric algorithm, or a combination hash/encryption technique, for example, are possible in addition to or instead of this signing process.

The advantage of a memory card lies in the simplicity in which an application may be introduced into the decoder. By the same token, the use of a memory card could potentially give rise to a problem of security by permitting the installation of pirate applications into a decoder. The use of signed code ensures the integrity of applications within the decoder and prevents, for example, the introduction of a "trojan horse" program or the like into the system.

Preferably, the decoder is provided with a plurality of smart card readers, to permit the reading of a smartcard carrying the executable application together with another smartcard, for example, a smartcard carrying a decryption key.

As mentioned above, a principal use of smart cards in the context of a decoder relates to the storage of decryption and encryption keys associated with that decoder. In the case where the executable code downloaded from the memory card is partially or wholly encrypted, decryption will most probably be carried out in relation to a public key stored on a subscription type smart card. A multislot decoder permits interaction between the two cards.

Other embodiments for a single-slot decoder are possible, for example, in which the application is downloaded from the first smartcard and stored in a buffer before the first card is removed and the second card inserted to verify the application, or in which an adapter is used to enable both cards to be inserted in parallel etc.

In one embodiment, the method may include the steps of downloading the application into the decoder, setting one or more parameters associated with the application and storing the parameters in the memory card for later use.

For example, in the case where the memory card is used as a vehicle for a testing application developed by the system designer, the application may include certain parameters, such as tuning frequency, which are to be set by the test operator.

The first time that the application is loaded into a decoder, the operator will have the option of selecting these parameters by, for example, using the remote controller of the decoder. Once fixed, the parameters can be stored on the card. Thereafter, testing of subsequent decoders will be carried out automatically in relation to these stored parameters.

For reasons of security, it is preferable that the application remain unchanged and only the newly set parameters reloaded back onto the card. The application may be, for example, stored in an access-restricted FLASH or ROM memory and the parameters loaded into an EEPROM memory unit on the memory card.

Advantageously, the memory card includes a physical switch means for selecting one of a plurality of applications stored on the card that will be downloaded upon insertion of the memory card in the decoder. For example, where the card is used as a vehicle for a number of configuration applications for a number of service providers, the card can include a DIL switch means which can be set by an operator to select the configuration application associated with that service provider.

The present invention extends to a decoder for use in a method as described above, in particular, a decoder adapted to read broadcast (eg MPEG) format data introduced via a card reader in the decoder. The present invention also extends to a memory card for use in such a method, in particular, including an application stored in a broadcast format in the card.

Whilst the description refers to "receiver/decoders" and "decoders" it will be understood that the present invention applies equally to embodiments having a receiver integrated with the decoder as to a decoder unit functioning in combination with a physically separate receiver. Such a decoder may be of the kind used in any satellite, terrestrial, cable etc digital broadcast system and may include other multimedia type capabilities or may be integrated with other devices such as a video recorder or television.

Similarly, the term "executable application" covers applications written in any form of code (interpretative code, compiled code, native code etc) and capable of being executed by a microprocessor within the decoder.

The term MPEG refers to the data transmission standards developed by the International Standards Organisation working group "Motion Pictures Expert Group" and in particular but not exclusively the MPEG-2 standard developed for digital television applications and set out in the documents ISO 13818-1, ISO 13818-2, ISO 13818-3 and ISO 13818-4. In the context of the present patent application, the term includes all variants, modifications or developments of MPEG formats applicable to the field of digital data transmission.

There will now be described, by way of example only, a preferred embodiment of the present invention, with reference to the attached figures, in which.

Figure 1:
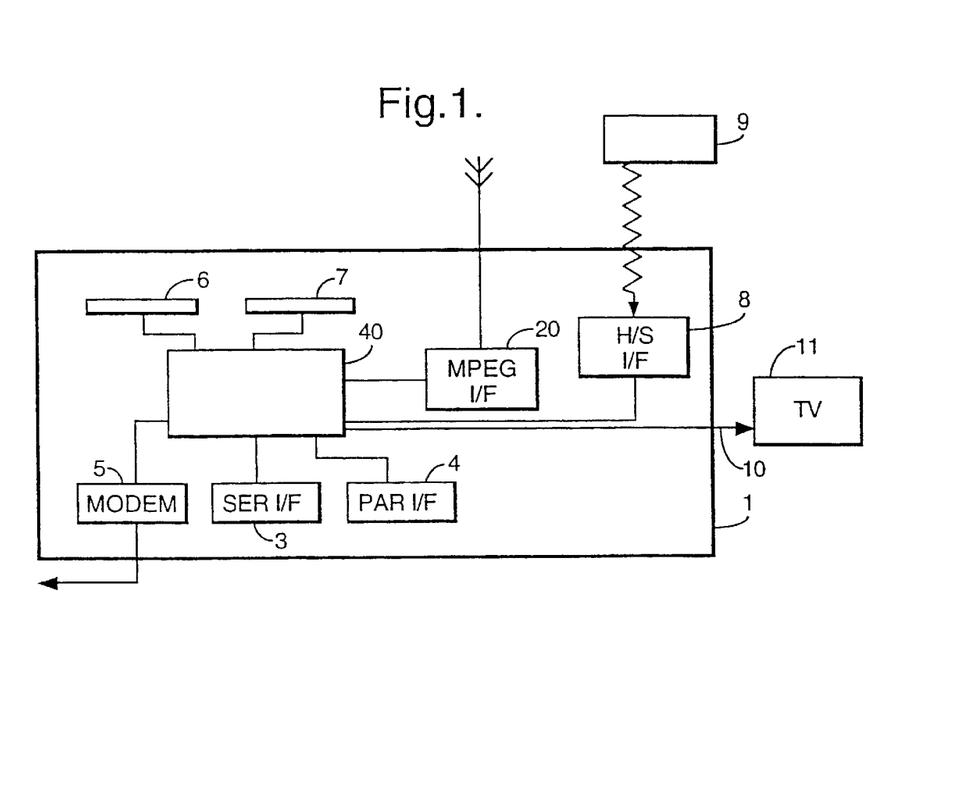
FIG. 1 shows an overview of the elements of a decoder.

Referring to FIG. 1, the elements of a receiver/decoder 1 or set-top box for use in a digital broadcast system and adapted to be used in the present invention will now be described. As will be understood, the hardware elements of this decoder are largely conventional and their implementation will be within the capabilities of one skilled in the art.

As shown, the decoder 1 is equipped with several interfaces for receiving and transmitting data, in particular an MPEG tuner and demultiplexer 2 for receiving broadcast MPEG transmissions, a serial interface 3, a parallel interface 4, and a modem back channel 5 for sending and receiving data via the telephone network. In this embodiment, the decoder also includes a first and second smart card reader 6 and 7, the first reader 6 for accepting a subscription smart card containing decryption keys associated with the system and the second reader 7 for accepting bank cards and, in this case, a smartcard containing an application to be downloaded.

The decoder also includes a receiver 8 for receiving infra-red control signals from a handset remote control 9 and a Peritel output 10 for sending audiovisual signals to a television 11 connected to the decoder.

Processing of digital signals received via the interfaces and generation of digital output signals is handled by a central control unit 40. The software architecture of the control unit within the decoder may take many forms. It may be based, for example, on a virtual machine interacting via an interface layer with a lower level operating system implemented in the hardware components of the decoder. In terms of the hardware architecture, the decoder will be equipped with a processor, memory elements such as ROM, RAM, FLASH memory etc. as in known decoders.

Figure 4:
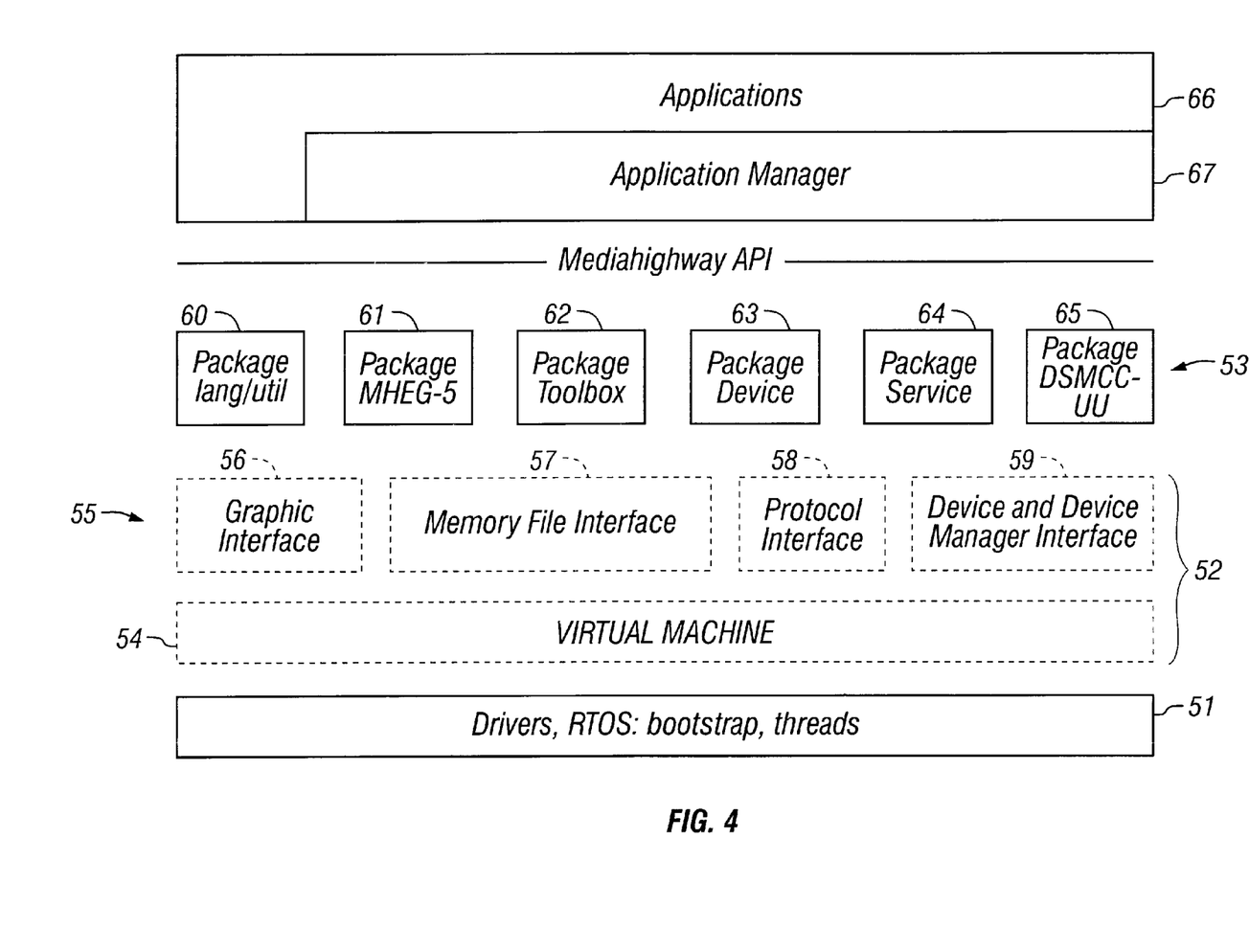
FIG. 4 shows the software architecture of the decoder of FIG. 1.

A particular implementation of a software architecture will now be described in relation to FIG. 4. It will be seen that a layered architecture is used. The first layer 51 represents the operating system of the hardware of the receiver/decoder. This is a real-time operating system chosen by the manufacturer to control the hardware elements of the receiver/decoder. The real-time operating system has a relatively fast response time in order to be able to correctly synchronise hardware operations. A data processing system layer sits on top of the hardware operating system and comprises a middleware layer 52 and an application interface layer 53.

Event messages are passed between the operating system layer 51 and the middleware layer 52 immediately above. The middleware layer is written in a language such as C ANSI and comprises the elements of a virtual machine 54 and a number of interfaces 55 including a graphical interface 56, a FLASH/PROM memory interface 57, a protocol interface 58 and a device interface 59.

The use of a virtual machine 54 enables independence between upper level applications 66 which are usually provided by the system manager or one or more operators, and a lower level operating system 51, usually implemented by the hardware manufacturer of the decoder.

The interfaces 60 provide the link between operations of the virtual machine and the lower level operating system 51 and also include a number of intermediate level application modules more easily executed at this level.

The application interface (API) layer 53 comprises a number of high level packages 60–65, written in an object-oriented interpretative language, such as Java. These packages provide an interface between the high level applications generally created by the service provider (interactive program guide, teleshopping, internet browser etc) and the virtual machine of the system.

The lower level OS is normally embedded in the hardware components of the decoder, although in some realisations, the lower level OS can be downloaded. The middleware and application interface layer packages can be downloaded into the RAM or FLASH memory of the decoder from a broadcast transmission. Alternatively, some or all of the middleware or application interface layer elements can be stored in the ROM or (if present) FLASH memory of the decoder. As will be understood, the physical organisation of the memory elements of the decoder is quite distinct from the logical organisation of the memory.

Turning in detail to each layer, the interface layer 55 above the virtual machine 54 will now be described. As shown it comprises four modules, a graphics module 56, a memory file management module 57, a protocol module 58 and a device manager 59. Whilst the modules at this level are described as interface modules their function is to provide a "glue" layer for the implementation of the application interface packages and for the operation of the virtual machine generally.

The graphics module 56 provides the creation and management of graphical objects. It asks the low level OS to display basic graphic shapes such as single pixels, lines, rectangles etc. In a similar manner, the memory file management module 57 includes low level read/write file commands associated with the memory components of the system. The protocol management module 58 defines a library of communication protocols that may be called upon in communications via, for example, the TCP/IP layer of the decoder.

The device manager 59 is slightly different from the other modules in this layer in that it provides the link or interface between the hardware operating system and the layers above, including the other modules in the interface layer and the virtual machine. Commands or event messages that are received/sent to the hardware OS from the virtual machine, for example, are necessarily passed by the device manager for conversion according to the interface specifications between the two levels.

Referring now to the application interface layer 53, the packages in this layer are written in an object oriented language such as Java. Each package defines a set of class libraries called on during operation of the system. Their class behaviour will depend on the language chosen, a single inheritance class structure being adhered to in the case of Java. In the present system the following packages are installed.

Lang/Util Package 60. These packages define the classes necessary for the manipulation of objects by the virtual machine. These class libraries normally form part of a standard library associated with the object oriented language chosen. MHEG-5 Package 61. This package defines the classes associated with the manipulation of graphical objects on the television display. Such objects are distinct from audio-visual data and can make up, for example, channel identifiers or text laid over displayed images. The definition of classes within this package should respect the MHEG-5 norms defined by the standards ETS 300777-3 and ISO/ISE 13522-5 (and the standard ISO/ISE 13522-6 in the case of a Java implemented system).

Toolbox Package 62. This package contains the classes used for downloading and decompression of information as well as the classes associated with the management of the file system and memory within the receiver/decoder and the classes associated with the connection to the internet etc.

Device Package 63. This package defines the classes necessary for management of peripherals attached to the receiver/decoder, as discussed above and including the modem, the smart card readers, the MPEG flow tuner etc.

Service Package 64. This package defines the classes necessary for the implementation of developing higher level interactive applications, such as management of credit card data etc.

DSMCC-UU Package 65. This package implements the protocols necessary for communication between a client and a server for data file search and reading. Implementation of this package should respect the norm ISO/IEC 13818-6 and directives defined in DAVIC part 9.

Finally, a number of high level applications 66 sit on top of and communicate with lower levels in the system via the application interface layer 53. In the present embodiment, the use of a virtual machine type architecture means that applications will be written in an interpretative language, such as Java. Other software systems for handling executable applications written in alternative types of code are of course possible. As will be described below, applications may originate from a variety of sources and/or operators. In particular, in the present embodiment of the invention, executable applications are installed via a smart card interface.

An application introduced into the decoder corresponds to a section of code introduced into the machine that permits the control, for example, of higher level functions of the machine. These may include the generation of a graphic sequence on the screen of the television display in response to a command from the remote control, or the emission of a message via the modem 5 to the server associated with the digital broadcast system. The execution and maintenance of applications may be handled by an application manager 67, itself installed at the application layer.

Applications may be resident applications stored in the ROM or FLASH of the decoder or applications broadcast and downloaded via the MPEG interface 2 of the decoder. Applications can include program guide applications, games, interactive services, teleshopping applications, as well as initiating applications to enable the decoder to be immediately operational upon start-up and applications for configuring and testing the decoder. Applications are stored in memory locations in the decoder and represented as resource files comprising graphic object description files, unit files, variables block files, instruction sequence files, application files, data files etc.

In the case of a broadcast transmission, a number of types of data stream may be present, for example, a video data stream, an audio data stream, a text data stream etc. In accordance with MPEG standards each transport packet is preceded by a Packet Identifier (PID) of 13 bits, one PID for every packet transported in the MPEG stream. A programme map table (PMT) contains a list of the different streams for a particular service or "channel" and defines the content of each stream according to the respective PID. A PID may alert the device to the presence of applications in the data stream, the PID being identified by the PMT table.

Within an MPEG transport stream containing an application there may be three or more levels of packet structure. A first layer corresponds to the basic transport layer comprising a series of fixed size transport packets.

Furthermore, applications downloaded into the decoder via the broadcast link are divided into modules, each module corresponding to one or more MPEG tables encapsulated within the above mentioned transport packets. Each MPEG table may be divided into a number of sections. For data transfer via the serial and parallel ports, modules are also split into tables and sections, the size of the section depending on the channel used. A similar sectioning is applied to MPEG tables downloaded using the smartcard of the present embodiment.

Finally, this sectioning of an application into MPEG tables is independent of any structuring of the application data itself. For example, an application may be organised into a number of files arranged within a data carousel as per the DSM-CC protocol, for example.

Figure 2:
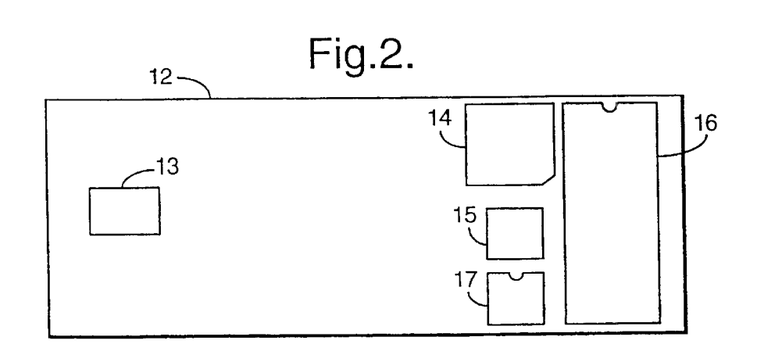
FIG. 2 shows a memory card, adapted to be read in a card reader slot in the decoder of FIG. 1.
Figure 3:
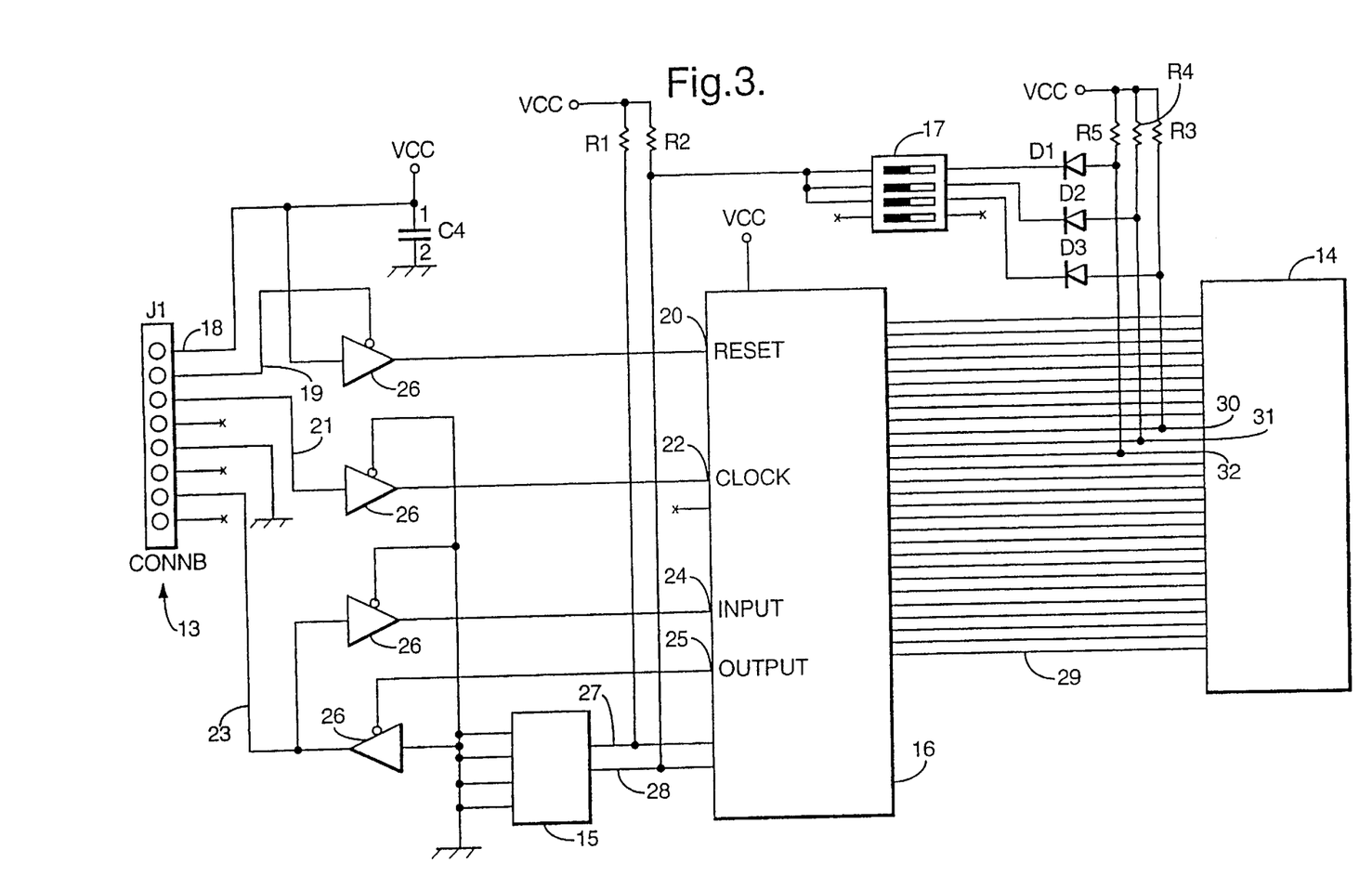
FIG. 3 shows a circuit diagram of the components of the card of FIG. 2.

Referring to FIGS. 2 and 3, the structure of a smartcard 12 adapted to charge an executable application in the decoder will now be described. FIG. 2 shows a plan view of the smartcard, comprising an area of contacts 13, a FLASH ROM memory 14, an EEPROM memory 15, a microprocessor 16, a DIL switch unit 17 and a number of other discrete components. Unlike standard smart cards, the presence of additional memory elements 14, 15 enables an executable application of a significant size to be stored on the smart card.

The memory card 2 possesses the width and thickness of a standard normalised smart card so as to enable its insertion in a smart card slot of the decoder. However, as will be seen from FIG. 2, the card is longer than a standard card to enable the incorporation of all the components described on its surface. In the context of its use in the initial configuration of the decoder this increase in size may not be significant. In alternative situations, for example, where the card is intended to be supplied to the eventual user of the decoder, some components such as the DIL switch unit 17 and EEPROM 15 may be omitted. The remaining components may be miniaturised and the whole card designed to conform with smart card norms.

Referring now to FIG. 3, the contacts 13 engaged in the smart card reader in the decoder may be divided by function into a power supply line 18 which supplies the card voltage Vcc, a reset line 19 connected to the corresponding reset terminal 20 of the microprocessor, a clock line 21 connected to clock terminal 22 of the microprocessor, and an I/O line 23 connected to corresponding input and output terminals 24,.25 of the microprocessor. As shown, connections are made via a series of op-amps 26. The power supply is regulated by means of a capacitor C4.

The EEPROM memory unit 15 is connected via lines 27, 28 to the microprocessor 16, these lines being biased by the power supply Vcc connected via the resistances R1 and R2. The function of the EEPROM memory will be discussed in more detail below in relation to the configuration application. The microprocessor 16 is connected by a series of lines 29 to corresponding terminals of the FLASH memory 14. The state of three of these lines 30, 31, 32 is determined by the switch unit 17 connected via a series of diodes D1, D2, D3 and biased by the power supply Vcc connected by resistances R3, R4, R5. By switching each of the switches ON or OFF, a binary control word 000, 001, 010, 011 etc can be defined. As will be discussed, this binary word is used to determine the first block in the FLASH memory that will be accessed upon insertion of the card and, hence, the application that will be charged into the decoder.

The card 12 is designed to engage in the credit card reader 7 of the decoder 1, the reader 6 being reserved for the subscription card associated with the broadcast system which contains the keys necessary for, inter alia, decoding scrambled transmissions and verifying downloaded code. Upon insertion, the reader checks the type of card inserted, by means of a simple handshake signal to the card. In the event that the reader identifies the card as being a card of the type containing application code for loading into the machine, the decoder will access the first block of code in the FLASH memory 15 at the hexadecimal address corresponding to the binary message indicated by the switch unit 17.

In the case, for example, where the card is intended to be used in the testing of decoders for a number of service providers, a different application may be loaded corresponding to the service provider in question or corresponding to the functions that need to be tested. In addition or alternatively, a first setting of the switches may be used to download the application supplied with the card and a second to download a different application and/or associated parameters set by the service provider (see below).

The application code is downloaded from the from the card in a series of modules, the modules then being assembled to form a series of MPEG-2 (short form) tables, as described above in connection with broadcast data. The advantage of formatting data according to the MPEG format is that the virtual machine within the central control unit of the decoder can directly process applications received in this format, in the same manner as it processes applications received via the broadcast link. As will be appreciated, this leads to considerable reductions in the time needed to process the application etc.

The format of the MPEG private sections in this case is as follows:

| | |
|---|---|
| table_id | 8 bits |
| section_syntax_indicator (=0) | 1 bit |
| private_indicator (=1) | 1 bit |
| reserved | 2 bits |
| private_section_length | 12 bits |
| table_id_extension | 16 bits |
| reserved | 2 bits |
| version_number | 5 bits |
| current_next_indicator | 1 bit |
| section_number | 8 bits |
| last_section number | 8 bits |
| private_data_byte | undetermined |

An application will be accessed by the decoder using the table_id and table_id_extension values.

Prior to storage in the card, the application code contained within the MPEG tables is encrypted to provide a digital signature. This signature is generated by the supplier of the card using a private key of a public/private key algorithm, such as RSA, and known only to himself. The decoder has access to a series of public keys on a subscription card inserted in the other card reader.

In the event that the decoder confirms that the code has originated from a known source, by verifying the digital signature, the application will be installed in the machine. Unverified code will be rejected by the decoder. In addition to verifying the code, the decoder may also use the public key to decrypt the code prior to operation.

Furthermore, encryption by a private/public algorithm may also be combined with a one-way hash type function, such as MD5. For example, a section of code may be processed to provide a hash value, this hash value then being encrypted by the private key to provide the digital signature.

Other encryption techniques used in broadcast digital systems may also be applied, for example, to encrypt the code according to one or more private keys known to the supplier of the application card to prevent a third party from decrypting and using the application stored on the card. The decoder possesses the key or keys necessary to decrypt the code as stored on a subscription card. This encryption can be carried out in addition to and after the signature of the code. This encryption/decryption may be carried out, for example, using a symmetric algorithm.

The use of a subscription card to hold the necessary decryption keys generally requires that the decoder is also provided with a second smartcard reader, since both cards will be addressed by the decoder during the downloading and verification steps. Alternative embodiments are conceivable, for example, in which data is first downloaded from the application card into a buffer, the application card removed and the card containing the decryption keys inserted etc. However, as will be appreciated, these are less convenient than the use of a decoder equipped with two or more smartcard readers, particularly since one or the other of the cards may need to be re-addressed at any moment.

The installation of a test application within the decoder will now be described. Typically, such a test application is used by a service provider to test the correct operation of the hardware layer. For example, the test application may control the tuner of the decoder to test that the decoder can correctly receive data transmitted on a given channel frequency.

The loaded application may be interactive so as to permit the operator to enter specific parameters into the decoder by means of, for example, the remote control handset. In the case of the tuning frequency the operator may manually adjust the set frequency until the clearest reception is obtained. Once these parameters are known for one decoder, they will be the same for the rest of the series. It is therefore desirable that this and other parameter values can be memorised in order to avoid repeating the operation for each decoder.

Accordingly, once defined by the operator in relation to a first decoder, these parameters are downloaded into the EEPROM memory 15 of the card. Upon removal of the card, the operator changes the setting of the switches in the switch unit 17 such that an application at a different address within the FLASH memory will be accessed upon its next insertion in a decoder. When the card is then reinserted in the next in the series of decoders, this new application will be loaded into the decoder. Upon execution, the application will signal the presence of pre-determined parameter values stored in the EEPROM and these values will be automatically loaded into and set in the decoder. In the case of the tuner, for example, the application will automatically set the tuner to the frequency selected by the operator for the first decoder and the operator can then immediately determine whether the tuner operates correctly or not.

In view of the relative difficulty in writing data to a FLASH unit (as compared to an EEPROM) it is preferable, though not essential, that the FLASH memory be used for applications that will not be modified in use and the EEPROM memory be reserved for data downloaded into the card.

Furthermore, in order to increase the security of the system, the FLASH memory may be locked into a read-only configuration by the microprocessor upon initial connection of the card, and/or upon receipt of an unknown instruction. Other memory combinations and configurations are of course possible, using ROM devices etc.

Whilst the above embodiment has been discussed in relation to a smartcard realisation, other portable memory cards, such as PCMCIA cards, may be used if the decoder is capable of reading such cards.

What is claimed is:

1. A method for downloading an application into a decoder, comprising:
   storing an application on a portable memory card in a packet organization format corresponding to a broadcast data format;
   introducing the portable memory card into a card reader located in the decoder;
   downloading the application into the decoder from the portable memory card according to the packet organization format.

2. A method as claimed in claim 1 in which the card is adapted to be read in a smart card reader in the decoder.

3. A method as claimed in claim 1 in which the executable application stored within the card and downloaded into the decoder is formatted according to an MPEG data format.

4. A method as claimed in claim 3, the application being subdivided into a plurality of modules in the memory of the card, the modules being downloaded and assembled by the decoder to form the complete application.

5. A method as claimed in claim 1, in which the application is written in interpretative code.

6. A method as claimed in claim 1, in which some or part of the application stored within the memory card is encrypted with one or more encryption keys.

7. A method as claimed in claim 1 in which some or part of the data stored in the memory card has been encrypted and/or signed with a private key, the decoder having access to the equivalent public key so as to decrypt and/or authenticate the origin of the application.

8. A method as claimed in claim 1 in which the decoder is provided with a plurality of smart card readers, to permit reading of a smartcard carrying the executable application and another smartcard.

9. A method as claimed in claim 1 including the steps of downloading the application into the decoder, setting one or more parameters associated with the application and storing the parameters in the memory card for later use.

10. A method as claimed in claim 1 in which the card includes a physical switch means for selecting one of a plurality of applications stored on the card that will be downloaded upon insertion of the memory card in the decoder.

* * * * *

UNITED STATES PATENT AND TRADEMARK OFFICE
CERTIFICATE OF CORRECTION

PATENT NO.     : 6,478,222 B1
DATED          : November 12, 2002
INVENTOR(S)    : Sarfarti It is certified that error appears in the above-identified patent and that said Letters Patent is hereby corrected as shown below:

<u>Title page,</u>
Item [63], please correct the priority date from "October 28,1998" to
-- October 27, 1998 --.
Item [30], please correct the priority number from "97402561" to
-- 97402561.1 --.
Item [57], ABSTRACT,
Line 5, please remove the word "be" between the words "may" and "preferably".
Line 6, please replace the word "smart card" with -- smartcard -- between the words "the" and "in".

Signed and Sealed this

Twentieth Day of May, 2003

JAMES E. ROGAN
*Director of the United States Patent and Trademark Office*